June 9, 1925.
J. M. BREITENBACH ET AL
1,541,473
INDUSTRIAL TRUCK
Filed June 29, 1921
3 Sheets-Sheet 1
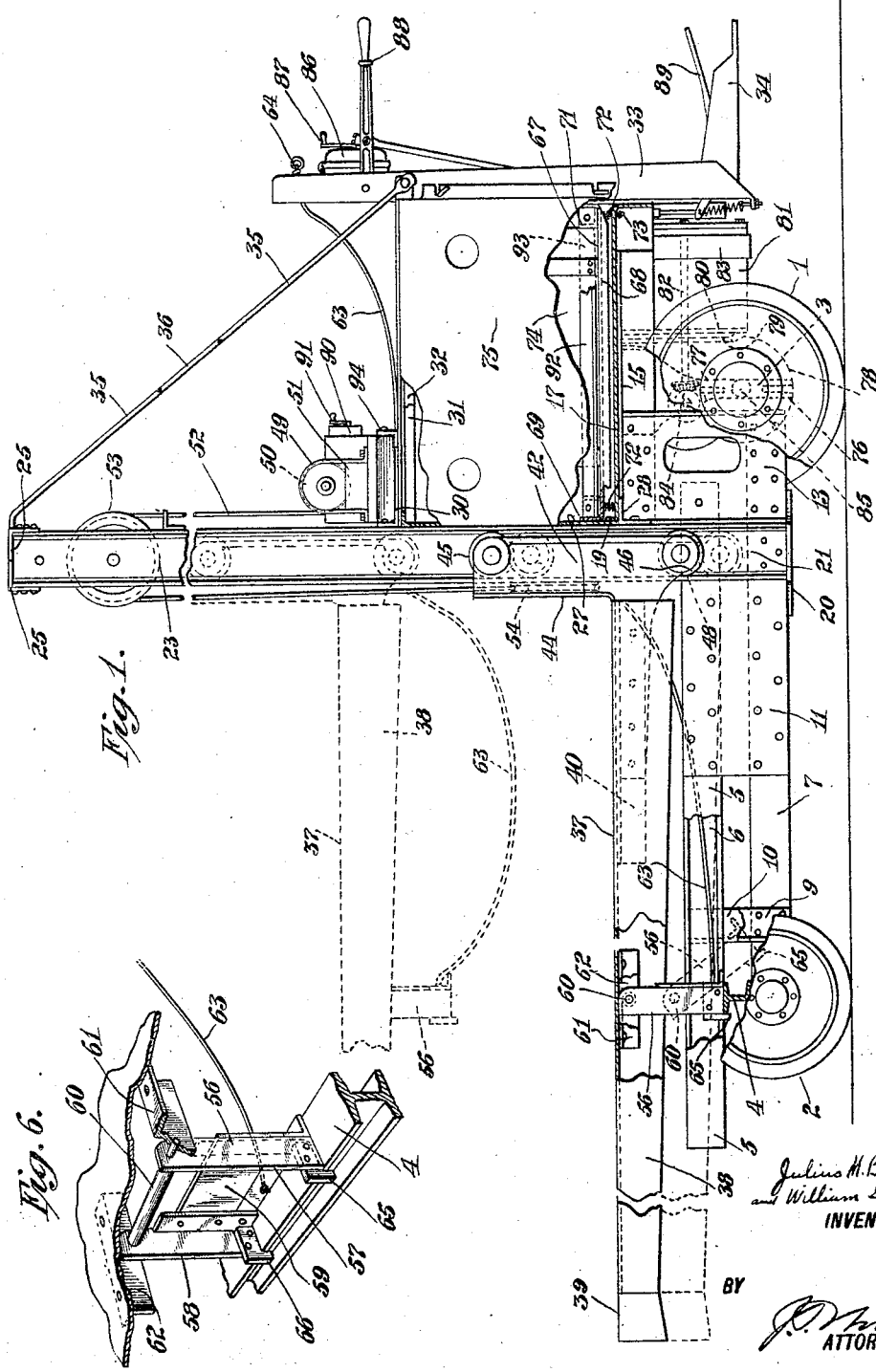
Julius M. Breitenbach
and William Schroeder
INVENTORS,
BY
ATTORNEY June 9, 1925.
J. M. BREITENBACH ET AL
1,541,473
INDUSTRIAL TRUCK
Filed June 29, 1921
3 Sheets-Sheet 2
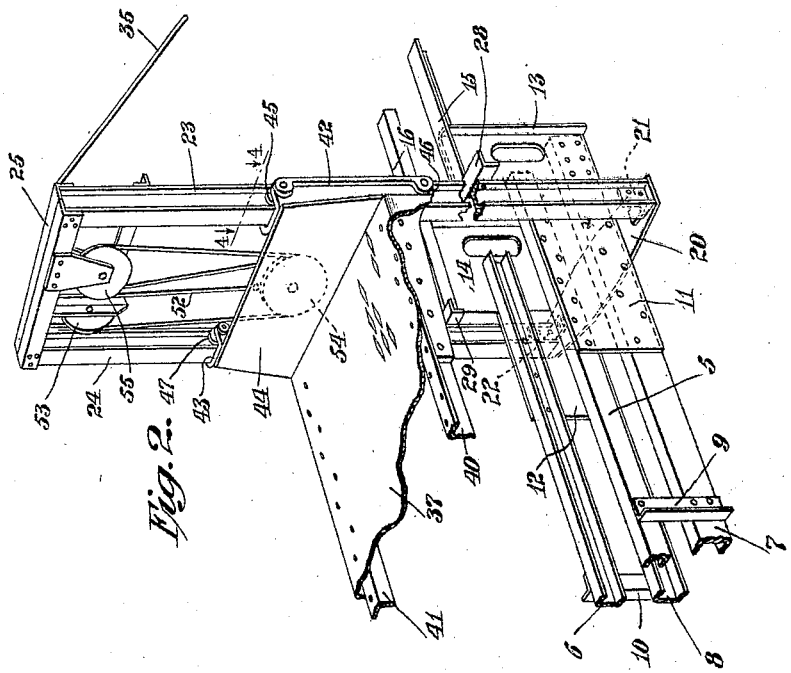
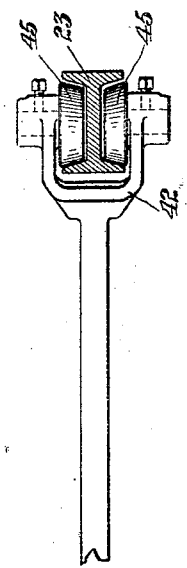
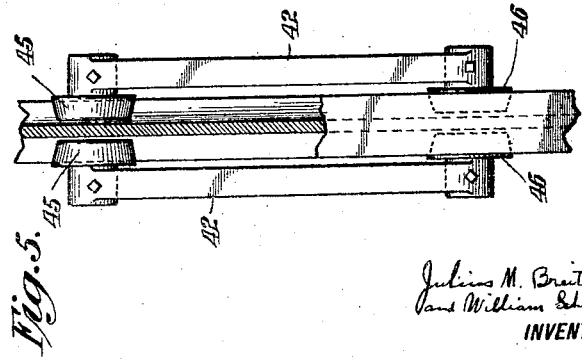
Julius M. Breitenbach
and William Schroeder
INVENTORS
BY
J. O. Worster
ATTORNEY

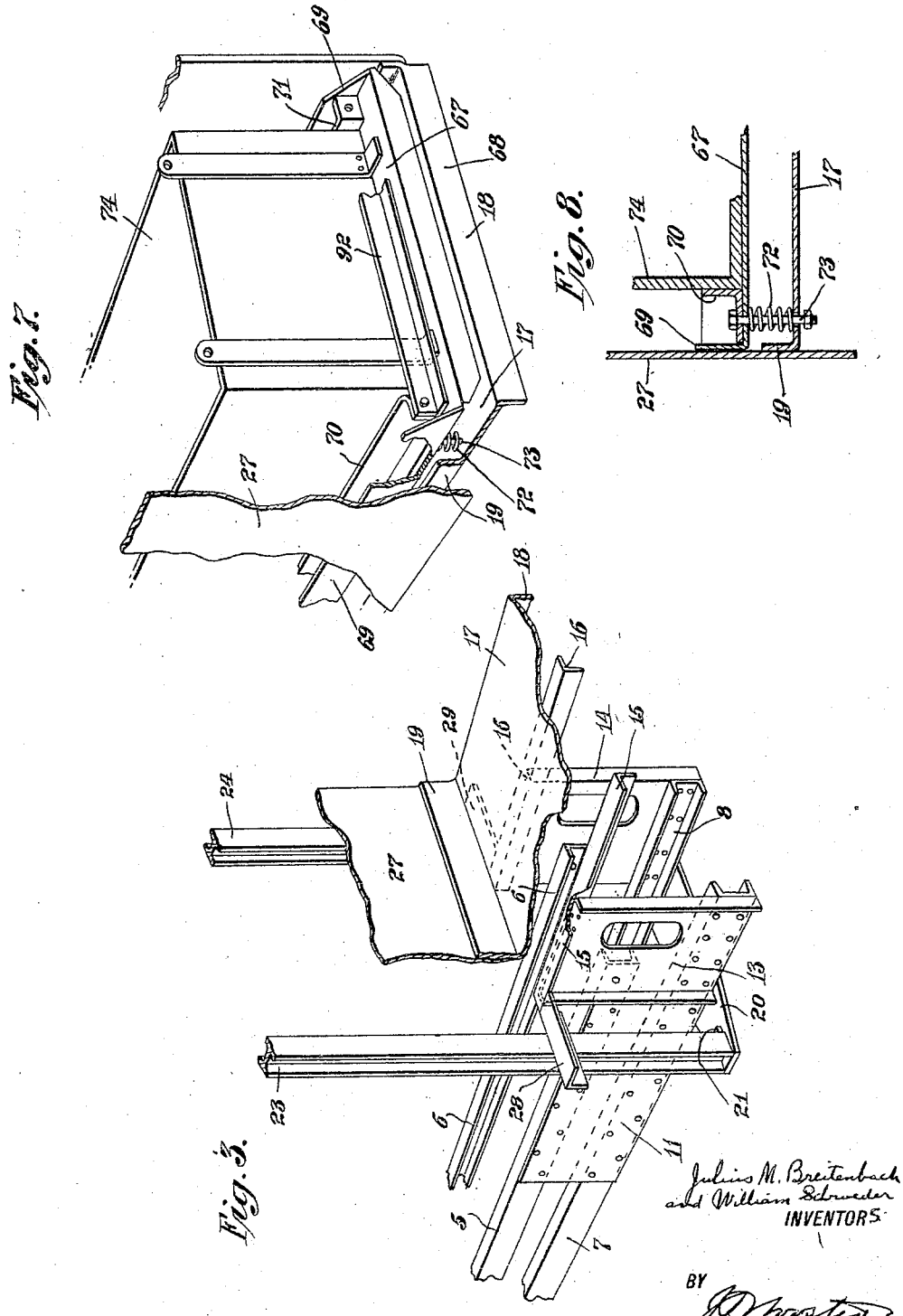

Patented June 9, 1925.

1,541,473

UNITED STATES PATENT OFFICE.

JULIUS M. BREITENBACH, OF NEW YORK, AND WILLIAM SCHROEDER, OF BROOKLYN, NEW YORK.

INDUSTRIAL TRUCK.

Application filed June 29, 1921. Serial No 481,232.

*To all whom it may concern:*

Be it known that we, JULIUS M. BREITENBACH and WILLIAM SCHROEDER, citizens of the United States, and residents of Manhattan, county of New York, and of Brooklyn, in the county of Kings, in the city and State of New York, respectively, have invented certain new and useful Improvements in Industrial Trucks, of which the following is a specification.

This invention relates to industrial trucks, and more particularly to power driven industrial trucks employed for both carrying and stacking and having a platform which may be raised and lowered to facilitate the carrying out of the latter operation.

Until recent times the handling of baggage, goods packed for shipment, and other heavy articles, in loading or unloading freight cars, stacking, or transferring between floors of different level, has been accomplished only by manual labor. The goods were packed upon trucks and thus carried to the point where they were required to be piled or transferred to a different level, and then were separately raised or lowered from the truck, either by direct manual effort, or by a stationary crane requiring separate handling of each article, and thus stacked or reloaded upon another truck. In moving goods about railway stations, wharves, etc., every change of level thus involved both unloading and reloading.

A marked improvement over this practice has developed, whereby the goods are packed upon wheeled trailers, and these trailers are carried bodily upon trucks having platforms which can be raised or lowered. When the goods are to be transferred to a floor of higher level from a lower floor, the truck is brought to the edge of the lower floor, its platform is raised sufficiently to enable it to clear the upper floor and the truck is then advanced far enough to bring the trailer over the upper floor. The truck platform is now lowered sufficiently to permit the trailer wheels to bear upon the upper floor, and the truck is backed out and its platform is lowered, in which condition it is ready to receive another load. The transferring of goods from the higher to the lower platform is accomplished by reversing the process above described.

In mounting the loaded trailer upon the truck platform, it is necessary to lower the latter to its lowest position to enable it to clear the trailer platform, then to run it under the latter and raise it until the trailer wheels clear the ground. The truck is now ready for hauling. This raised position of the truck is its normal or carrying position.

Hitherto the heavily loaded truck platform when in normal or hauling position, has been left unsupported except for the raising and lowering means, which is necessarily located at one end to permit the truck to be moved in under floors of higher level. The entire load is thus carried by the raising and lowering means, which causes a large amount of unnecessary wear in the hoisting mechanism and truck frame. The unsupported end of the platform hangs loosely, and is subject to swaying and vibration. In case of failure of the hoisting mechanism, which is normally under maximum strain, the entire platform and its burden will drop instantly, with danger of injury to the truck and the goods carried thereon.

We have devised a form of truck for the uses above mentioned, in which the truck platform when in normal position is firmly supported beneath its center of gravity by means entirely independent of the hoisting mechanism, which is normally free of all tension. We also provide a novel form of hoist to cooperate with the aforesaid means, and embody in the design of the truck certain general features of construction which facilitate operation. We further provide an improved means for supporting the storage batteries to relieve them from shock and vibration.

With these and other objects in view we have devised the apparatus embodying our invention as described in the following specification, and illustrated in the accompanying drawings, of which—

Figure 1 is a side elevation, with parts broken away, of the truck,

Figure 2 is a perspective view looking forward, of the hoist attached to the truck frame and to the end of the platform, Figure 3 is a perspective view looking toward the rear, showing certain details of the frame construction, Figure 4 is a horizontal section taken on the line 4—4 of Figure 2 looking in the direction of the arrows, Figure 5 is a part end view and part transverse section of the members shown in Figure 4, Figure 6 is a fragmentary perspective view of the platform supporting means, Figure 7 is a fragmentary perspective view showing the battery supporting means, and Figure 8 is a longitudinal vertical section of a portion of the battery supporting means.

1 represents the front wheels of the truck, which are the driving wheels, and 2 the rear wheels, of smaller diameter than front wheels 1; 3 and 4 represent the front and rear dead axles respectively, which preferably are of channel or I beam section. Supported at one end by rear axle 4 and extending forward thereof are the longitudinal frame members 5 and 6, preferably of channel section with flanges turned inwardly. Beneath and parallel to said last members are a similar pair of channels 7 and 8 respectively. A vertically extending angle iron 9 connects channel 7, adjacent its rear end, to channel 5; angle iron 10 similarly connecting channels 8 and 6. Channel 5 is connected, along its intermediate portion, to channel 7 by a plate 11; channel 6 being similarly connected to channel 8 by a plate 12. The forward ends of channels 5 and 7 are secured to a vertically extending outwardly turned channel plate 13, and where an unusually strong construction is desirable, plate 11 is extended forward between plate 13 and channels 5 and 7, and the three thicknesses of metal are bolted together. The forward ends of channels 6 and 8 are likewise secured to a similar channel plate 14. The forward flanges of plates 13 and 14 are directly connected to forward dead axle 3. Bolted to the upper edges of plates 13 and 14 are a pair of parallel horizontal angle irons 15 and 16 respectively, and secured to and supported upon the upper flanges of angle irons 15 and 16 is a horizontal plate 17, having its lateral edges flanged downwardly as at 18, and having its rear end flanged upwardly as at 19.

Bolted to the under flanges of channels 7 and 8 is a transversely extending plate 20. Upon the ends of plate 20, and secured thereto by brackets 21 and 22 respectively, are mounted vertical hoist columns 23 and 24, preferably of I beam section with the web extending longitudinally of the truck. Columns 23 and 24 are connected at the top by cross piece 25. A vertical transverse plate 27, having flanged lateral edges, extends across the forward flanges of columns 23 and 24. Flange 19 is secured to the column flanges, by bolts countersunk into the inner surfaces of the flanges, and passing through the lower portion of plate 27, which is thus clamped between flange 19 and the forward flanges of columns 23 and 24. Brackets 28 and 29 are likewise bolted through plate 27 to the forward flanges of columns 23 and 24 respectively, and being bolted directly to plate 20 serve to reinforce the connection between columns 23 and 24 and the frame members. Bolted to the upper portion of plate 27 is a transversely extending channel or angle iron 30, and a pair of forwardly extending angle irons 31 and 32. Secured to the forward ends of angle irons 31 and 32, and of plate 17 is a transverse vertical end plate 33, to the lower edge whereof is hinged the driver's step 34. A pair of diagonal braces 35 and 36 connect the upper ends of columns 23 and 24 with the forward ends of angle irons 31 and 32 respectively.

Truck platform 37 is constructed of sheet metal, permitting a certain amount of flexibility, the edges on either side being stiffened by flanging over, as at 38. To the rear end of platform 37 is secured a cast steel buffer 39. A pair of parallel angle irons 40 and 41 are bolted to the under surface of platform 37, and extend rearwardly from the forward end thereof for a distance about one third the length of the platform. Secured to the forward ends of angle irons 40 and 41 respectively, are brackets 42 and 43. The forward edge of platform 37 is flanged upwardly as at 44 and is also secured to brackets 42 and 43. An upper roller 45 and a lower roller 46, both travelling within one of the channels of I beam section column 23, are rotatably mounted in bracket 42, a similar pair of rollers 47 and 48 are rotatably mounted in bracket 43 and travel in one of the channels of column 24. As the I beam sections afford double channels, it is well to employ a double set of rollers 45 and 46, and of rollers 47 and 48, thus utilizing both inner and outer channels of the respective columns, securing a symmetrical distribution of the load, and preventing lateral displacement of the rollers; but in certain cases it may be desirable to employ single channel section columns, in which case single pairs of channels may be used. Rollers 45, 46, 47 and 48 should be of such diameter as to permit a slight clearance between the same and the opposite flanges of the respective columns. As the inner faces of the flanges are generally tapered, the rollers should be coned to correspond with the taper of the flanges. The forward ends of brackets 42 and 43 respectively are of yoke form, extending around the rear flanges of the respective columns to provide for mounting the rollers in either channel of the I beam on the bracket.

A hoisting motor 49 is coupled to a winding drum 50, anchored to transverse members 30 and 94, and covered by a housing 51. Hoist cable 52 is attached at one end to winding drum 50, and passes over a pulley 53 bracketed to cross piece 25, thence around a pulley 54 carried by the upturned flange 44 of platform 37, and thence over a pulley 55 bracketed to cross piece 25, the free end being secured to flange 44. Adjacent motor 49 is a controller 90 for the same, having controller handle 91.

Platform 37 overhangs, by about half its length, rear axle 4. When in lowermost position it rests directly upon and is supported by longitudinal members 5 and 6, which then lie between angle irons 40 and 41. For supporting platform 37 when raised to normal or hauling position, a pivoted member 56 is provided, comprising a pair of links 57 and 58 connected by a stiffening plate 59 and depending from a cross shaft 60 carried by the respective flanges of angle iron brackets 61 and 62, the latter being bolted to the under surface of platform 37 directly over rear axle 4. Pivoted member 56 is sufficiently narrow to lie between longitudinal members 5 and 6, and normally hangs in such a position that when platform 37 is lowered from above hauling position, member 56 will contact and rest upon axle 4. A cable 63 secured to member 56 and passing through rollers or guides carried by the forward end of platform 37 and thence to the forward end of the truck terminating in handle 64, enables the operator to swing member 56 aside when he wishes to lower platform 37 below normal position. To prevent member 56 from being accidentally withdrawn or from slipping off axle 4 while carrying the load, a pair of ears 65 and 66 are secured to the lower rear portions of links 57 and 58 respectively, and latch over the rear side of axle 4.

A battery compartment is provided forward of columns 23 and 24 in the space above plate 17. A flexible plate 67, has its lateral edges flanged downwardly as at 68, and its transverse edges flanged upwardly as at 69 and stiffened by outwardly turned transverse angle irons 70 and 71, which together with flanges 69 form a channel section. Beneath each of angle irons 70 and 71 is a row of springs 72, which resiliently support plate 67 upon plate 17. Springs 72 are preferably helical, and disposed around guide bolts 73, secured to plate 67 and passing loosely through plate 17. The storage battery 74 rests upon plate 67 and fits between the upturned flanges of angle irons 70 and 71, which secure it against longitudinal movement, while a pair of outwardly turned angle irons 92 and 93 are attached to the lateral edges of plate 67 and secure battery 74 against transverse movement. Angle irons 92 and 93 are made easily removable, and either or both are clamped in place after battery 74 has been placed in position. Flanges 69 contact with plates 27 and 33 respectively and support plate 67 and battery 74 against longitudinal displacement. The tendency to lateral displacement will be considerably less, and will be resisted by bolts 73. A pair of detachable cover plates 75 constitute the lateral walls of the battery compartment.

The driving and steering arrangements are substantially the same as shown in our previous application No. 305,582, filed June 20, 1919. Forward dead axle 3 is arched, and integral therewith and at about the center thereof is a plate 76, to which is bolted a plate 77, forming a part of the differential transmission housing 78. The forward end of the transmission housing 78 also carries a plate 79, integral therewith, to which is bolted a corresponding plate 80 of motor casing 81. Attached to the forward end of the armature shaft 82 is a brake drum 83 adapted to rotate therewith. Armature shaft 82 at its rear end, carries a bevel gear adapted to drive through a train of gears 84 the conventional differential. Live axles 85 are of the full floating type, and drive the wheels 1, being provided with knuckle joints to permit the turning of front as well as rear wheels.

End plate 33 carries controller 86 for driving motor 81, controller handle 87, steering handle 88 and brake pedal 89. Steering is effected by the turning of all four wheels, which are connected to handle 88 through a system of rocker arms and links in manner similar to that disclosed in my aforementioned prior application. A brake band around brake drum 83 is actuated by pedal 89.

The operation of the truck will be apparent from the foregoing. The weight of the truck platform and its load will normally be sustained by pivoted member 56 disposed adjacent the center of the platform and substantially beneath its center of gravity in either loaded or unloaded condition. This central position, while desirable for many reasons, is not, however, necessary to insure relief of cable 52 from tension when the platform 37 rests on member 56, as the latter will carry the entire weight of the platform and its load regardless of the position of the latter. Even if member 56 were located adjacent either end of platform 37, it would still sustain the entire weight, and guide columns 23 and 24, together with rollers 45, 46, 47 and 48 will always maintain platform 37 in horizontal position. It will be seen that columns 23 and 24 are preferably disposed with their webs parallel, and platform 37 is disposed longitudinally of columns 23 and 24 to obtain the best result. By virtue of the construction here described, member 56 constitutes a releasable sustaining means for the platform entirely independent of the hoisting means, comprising cable 52, drum 50, motor 49 and pulleys 53, 54, and 55.

The flexibility and manner of supporting platform 37 serves to distribute the strains on columns 23 and 24 and to compensate for inequalities of level in the upper floor level.

It should also be noted that the arrangement of rollers 45, 46, 47 and 48 and columns 23 and 24 is such as to constitute a vertical guideway and means cooperating therewith and adapted to bear thereon in either forward or backward direction at vertically spaced points, rollers 45 and 47 being spaced vertically from rollers 46 and 48 respectively. The result of this arrangement is positively to hold platform 37 at all times in horizontal position with relation to the truck. Furthermore, by reason of the coning and duplication of each pair of rollers, lateral bearing components are provided in either direction at vertically spaced points. Thus bearing contact in all horizontal directions is provided between rollers and columns, and all movement of platform 37 is prevented except vertical translation.

What we claim is:

1. A truck comprising a platform, a wheeled support, means for sustaining said platform in normal position upon said wheeled support, and means substantially independent of said platform sustaining means for raising and lowering said platform and sustaining the same while loaded either above or below normal position.

2. A truck comprising a platform, a wheeled support, means carried by said support and secured to one end of the platform for raising and lowering the latter and for sustaining the same while loaded above and below normal position, and additional means for supporting the platform in normal position.

3. A truck comprising a movable platform, a wheeled support, platform raising and lowering means secured to one end of said platform and carried by said support, means for maintaining said platform horizontal in raised or lowered position, and additional means adjacent the center of said platform for sustaining the same in raised position.

4. A truck comprising a wheeled underframe, a platform, motor driven hoisting means and control mechanism therefor carried by said underframe for raising and lowering said platform by one end and for sustaining the same in any position thereof, means independent of said hoisting and sustaining means for supporting said platform in raised position, and means controlling the operation of said independent supporting means from adjacent the control mechanism of the hoisting and sustaining means.

5. A truck having a guide, comprising an I-beam of standard form, a pair of rollers travelling within one of the channels of the I-beam and adapted to bear upon the flanges thereof, the rollers being of slightly less diameter than the distance between the inner faces of the flanges to afford clearance and being coned to conform to the taper of the inner faces of the flanges, a similar pair of rollers travelling within the other channel of said I-beam, a yoke, means for rotatably mounting all said rollers in said yoke, and means for securing to said yoke the object to be guided.

6. A truck having a flexible platform composed of sheet metal, longitudinal stiffening members attached to said platform, a wheeled underframe, means carried by said underframe and rigidly secured to said stiffening members at one end of the platform for maintaining the same in horizontal position, raising and lowering means for said platform, and a releasable support depending from said platform.

7. The combination of a platform, raising and lowering means therefor, means for sustaining the platform in any position, and a support in addition to said sustaining means hinged to and normally depending from said platform, and adapted to be swung aside when the platform is to be lowered to a height less than said support in normal position would permit.

8. In a truck, a platform, a wheeled support, means for raising and lowering said platform with respect to said support, a supporting member hinged to and normally depending from said platform and normally bearing upon said wheeled support, and means for swinging said supporting member aside to permit lowering of the platform below normal position.

9. A motor driven industrial truck having a load platform, mechanism for raising and lowering said platform, a member adjacent the center of gravity of the platform for supporting the same in an intermediate position, and means for moving said supporting member out of the way to lower said platform below said intermediate position.

10. A motor driven industrial truck provided with a load platform, mechanism for raising and lowering said platform, an operator's support adjacent an end portion of the truck, a member adjacent the center of gravity of the platform for supporting the same in an intermediate position, and means operable from said operator's support for moving said supporting member out of the way to lower said platform below said intermediate position.

Signed at Long Island City, in the county of Queens and State of New York, this 9th day of June, A. D. 1921.

JULIUS M. BREITENBACH.
WILLIAM SCHROEDER.